United States Patent
Hammer et al.

(10) Patent No.: US 9,573,543 B2
(45) Date of Patent: Feb. 21, 2017

(54) BUMPER ASSEMBLIES INCLUDING A BUMPER COVER REINFORCEMENT

(71) Applicant: Toyota Motor Engineering & Manufacturing North America, Inc., Erlanger, KY (US)

(72) Inventors: Jeremiah Thomas Hammer, Ann Arbor, MI (US); Aaron Richard Steinhilb, Westland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 17 days.

(21) Appl. No.: 14/670,867

(22) Filed: Mar. 27, 2015

(65) Prior Publication Data

US 2016/0280164 A1  Sep. 29, 2016

(51) Int. Cl.
 *B60R 19/18* (2006.01)

(52) U.S. Cl.
 CPC ........ *B60R 19/18* (2013.01); *B60R 2019/1806* (2013.01); *B60R 2019/1886* (2013.01); *B60R 2019/1893* (2013.01)

(58) Field of Classification Search
 CPC ............ B60R 13/04; B60R 2019/1886; B60R 2019/186; B60R 19/18; B60R 2019/1806; B60R 2019/1893
 See application file for complete search history.

(56) References Cited

U.S. PATENT DOCUMENTS

| 4,765,665 | A | * | 8/1988 | Akahoshi | B60R 19/18 293/102 |
| 5,201,912 | A | * | 4/1993 | Terada | B60R 19/18 293/120 |
| 5,580,109 | A | * | 12/1996 | Birka | B60R 19/18 293/120 |
| 7,445,259 | B1 | * | 11/2008 | Mahe | B60R 19/18 293/102 |
| 7,740,293 | B2 | | 6/2010 | Kim | |
| 9,327,662 | B1 | * | 5/2016 | Hammer | B60R 19/12 |
| 2005/0017520 | A1 | * | 1/2005 | Evans | B60R 19/18 293/120 |

(Continued)

FOREIGN PATENT DOCUMENTS

DE  19861026   9/2002
DE  102005021724  11/2006

(Continued)

*Primary Examiner* — Gregory Blankenship
(74) *Attorney, Agent, or Firm* — Dinsmore & Shohl LLP

(57) ABSTRACT

A vehicle including a bumper assembly includes a bumper reinforcement beam that extends generally in a vehicle lateral direction. The bumper reinforcement beam has a front face, a rear face opposite the front face and a top extending between the front face and the rear face. A bumper cover is located above the bumper reinforcement beam in a vehicle vertical direction. A bumper cover reinforcement includes an anchor portion supported on the bumper reinforcement beam and a bumper cover support portion extending outwardly from the anchor portion toward the bumper cover. The bumper cover support portion is arranged and configured to resist a downward force applied to the bumper cover in the vehicle vertical direction.

20 Claims, 4 Drawing Sheets

(56) References Cited

U.S. PATENT DOCUMENTS

| | | | | |
|---|---|---|---|---|
| 2005/0280269 A1* | 12/2005 | Evans | ............... | B60R 19/18 293/120 |
| 2006/0145490 A1* | 7/2006 | Yamaguchi | ............ | B60R 19/18 293/109 |
| 2009/0243341 A1* | 10/2009 | Kimura | ............... | B60R 13/04 296/191 |
| 2009/0267364 A1* | 10/2009 | Crainic | ............ | B60Q 1/0408 293/117 |
| 2010/0176609 A1* | 7/2010 | Gill | ............... | B60R 19/18 293/120 |
| 2012/0038188 A1* | 2/2012 | Challal | ............... | B60R 19/18 296/193.09 |
| 2014/0091584 A1* | 4/2014 | McConnell | ............ | B60R 19/18 293/120 |
| 2015/0076863 A1* | 3/2015 | Baviskar | ............... | B60R 19/18 296/187.09 |
| 2015/0166130 A1* | 6/2015 | Lee | ............... | B60R 19/38 296/180.5 |
| 2016/0052443 A1* | 2/2016 | Baur | ............... | B60D 1/52 362/509 |

FOREIGN PATENT DOCUMENTS

| | | |
|---|---|---|
| DE | 102009017350 | 10/2010 |
| DE | 102011051442 | 1/2013 |
| DE | 102011107995 | 1/2013 |

\* cited by examiner

BUMPER ASSEMBLIES INCLUDING A BUMPER COVER REINFORCEMENT

TECHNICAL FIELD

The present specification generally relates to bumper assemblies and vehicles that include bumper assemblies, and more specifically, bumper assemblies that include a bumper cover reinforcement.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Such criteria can affect the rigidity or feel of the bumper assemblies. Accordingly, bumper assemblies are desired that allow for static subjective rigidity, particularly in the vertical direction, while maintaining pedestrian performance.

SUMMARY

In one embodiment, a vehicle including a bumper assembly includes a bumper reinforcement beam that extends generally in a vehicle lateral direction. The bumper reinforcement beam has a front face, a rear face opposite the front face and a top extending between the front face and the rear face. A bumper cover is located above the bumper reinforcement beam in a vehicle vertical direction. A bumper cover reinforcement includes an anchor portion supported on the bumper reinforcement beam and a bumper cover support portion extending outwardly from the anchor portion toward the bumper cover. The bumper cover support portion is arranged and configured to resist a downward force applied to the bumper cover in the vehicle vertical direction.

In another embodiment, a bumper cover reinforcement for supporting a bumper cover of a vehicle includes an anchor portion and a bumper cover support portion extending outwardly from the anchor portion. When installed in a vehicle, the anchor portion is configured to be supported on a bumper reinforcement beam and the bumper cover support portion is configured to extend toward the bumper cover and configured to resist a downward force applied to the bumper cover in a vehicle vertical direction.

In another embodiment, a method of providing a bumper cover rigidity is provided. The method includes engaging an anchor portion of a bumper cover reinforcement on a bumper reinforcement beam. The bumper cover reinforcement includes a bumper cover support portion extending outwardly from the anchor portion toward the bumper cover. The bumper cover support portion resists a downward force applied to the bumper cover in a vehicle vertical direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper assembly including a bumper cover that is reinforced in a vehicle vertical direction against a bumper reinforcement beam. As will be described herein, the bumper assembly includes a bumper cover reinforcement that extends forward of the bumper reinforcement beam and toward the bumper cover that limits movement of the bumper cover in response to a downward vertical force, which can improve static subjective rigidity of the bumper cover. The bumper cover reinforcement beam can also disengage the bumper reinforcement beam in response to a vehicle longitudinal force, which can maintain pedestrian performance of the bumper assembly.

Figure 1:
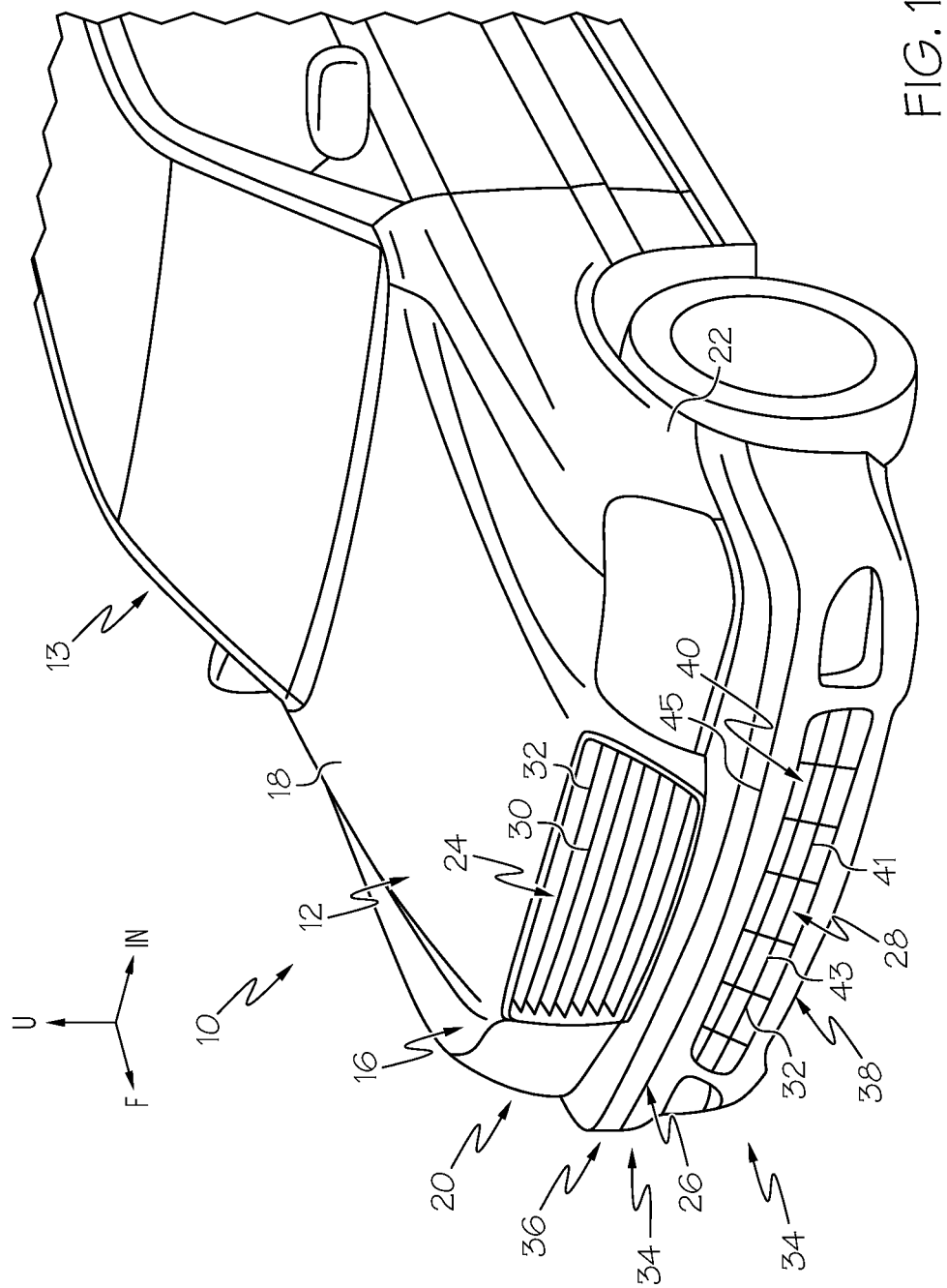
FIG. 1 schematically depicts a perspective view of a vehicle according to one or more embodiments shown or described herein.

As used herein, the term "vehicle longitudinal direction" refers to the forward-rearward direction of the vehicle (i.e., in the +/−vehicle F-direction depicted in FIG. 1). The term "vehicle lateral direction" refers to the cross-vehicle direction (i.e., in the +/−vehicle IN-direction depicted in FIG. 1), and is transverse to the vehicle longitudinal direction. The term "vehicle vertical direction" refers to the upward-downward direction of the vehicle (i.e., in the +/−vehicle U-direction depicted in FIG. 1). Further, the terms "inboard" and "outboard" are used to describe the relative positioning of various components of the vehicle with respect to a centerline of the vehicle.

Motor vehicles that incorporate elements according to the present disclosure may include a variety of construction methodologies that are conventionally known, including the unibody construction methodology as well as a body-on-frame construction methodology. While the embodiments of the present disclosure are described and depicted herein in reference to body-on-frame structures, it should be understood that vehicles that are constructed with unibody construction may incorporate the elements that are shown and described herein.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 includes a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or bumper fascia 34, an upper projecting bumper portion 36 and a lower projecting bumper portion 38 that under hangs the upper projecting bumper portion 36. The lower grille assembly 28 may include a covering portion 41 with a number of horizontally disposed grille deflectors 43 and be located between the upper projecting bumper portion 36 and the lower projecting bumper portion 38. In some embodiments, the bumper fascia 34 may provide a bumper cover 45. In other embodiments, the bumper cover 45 may be formed by a separate cover structure as part of the lower projecting bumper portion 38.

Figure 2:
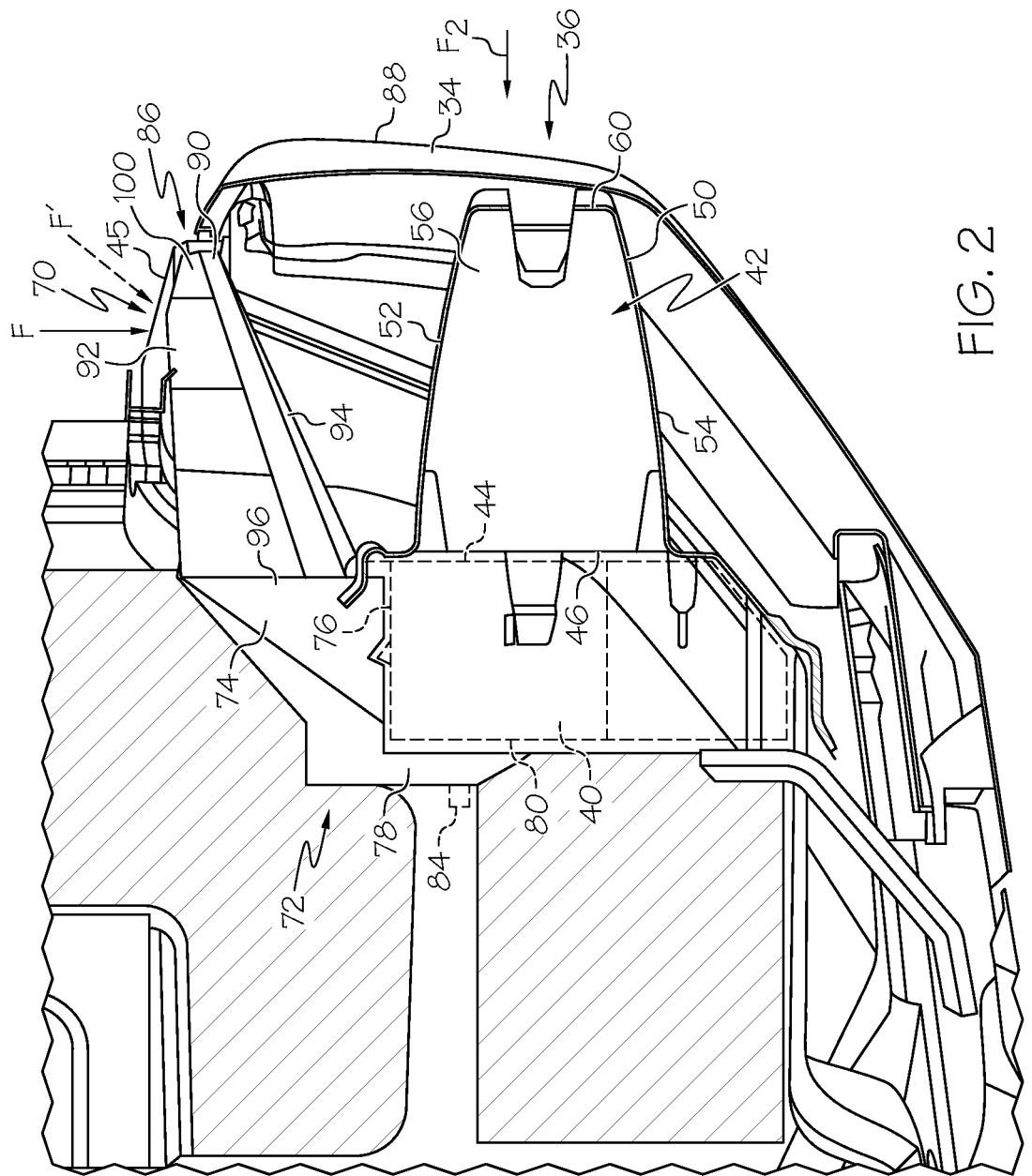
FIG. 2 depicts a side, section view of a bumper assembly of the vehicle of FIG. 1 according to one or more embodiments shown or described herein.

Referring to FIG. 2, the bumper fascia 34 is an outer covering for covering a bumper reinforcement beam 40 and a bumper energy absorber member 42 that both extend in the vehicle lateral direction between the front fenders 20 and 22 (FIG. 1). The bumper reinforcement beam 40 may generally have a curved shape in the vehicle lateral direction and extend forward in the vehicle longitudinal direction to a front face 44. The bumper fascia 34 also extends forward in the upper projecting bumper portion 36 to cover the bumper reinforcement beam 40 and bumper energy absorber member 42. A space may be provided between the bumper fascia 34 and the bumper energy absorber member 42. The space can allow for some rearward deformation of the bumper fascia 34 at the upper projecting bumper portion 36 before contacting the bumper energy absorber member 42. In other embodiments, the space may not be provided between the bumper fascia 34 and the bumper energy absorber member 42. For example, the bumper fascia 34 may be connected directly to the bumper energy absorber member 42.

The front bumper assembly 26 includes the bumper reinforcement beam 40 with the bumper energy absorber member 42 attached thereto and extending outwardly in the vehicle longitudinal direction. The bumper energy absorber member 42 may be connected to the bumper reinforcement beam 40 by any suitable method, such as fasteners, welding, adhesives, etc. The bumper energy absorber member 42 may generally include a mounting structure or base 46 that extends laterally along a length of the bumper reinforcement beam 40. A set of energy absorbing lobes 50 project outwardly from the base 46 in the vehicle longitudinal direction. Each energy absorbing lobe 50 includes a top 52, a bottom 54, sides 56 and 58 and an end 60 forming a somewhat closed, box-like structure. The energy absorbing lobes 50 may be each spaced-apart from each other in the vehicle lateral direction. The bumper energy absorber member 42 may be formed of any suitable material, such as plastic, and be formed by any suitable method, such as molding, machining, etc.

A bumper cover reinforcement 70 is used to reinforce the bumper cover 45 in the vehicle vertical direction. The bumper cover reinforcement 70 includes an anchor portion 72 that includes an upper beam engaging portion 74 that engages a top 76 of the bumper reinforcement beam 40 and a rear beam engaging portion 78 that engages a rear 80 of the bumper reinforcement beam 40. In the embodiment of FIG. 2, the upper beam engaging portion 74 of the anchor portion 72 extends rearward in the vehicle longitudinal direction over a rear upper corner 82 of the bumper reinforcement beam 40 and the rear beam engaging portion 78 extends downward in the vehicle vertical direction from the upper beam engaging portion 74 such that the anchor portion 72 extends about only a portion of the bumper reinforcement beam 40. In some embodiments, a releasable connection 84, such as a releasable fastener, adhesive, etc., may be used to releasably secure the rear beam engaging portion 78 to the rear 80 of the bumper reinforcement beam 40.

A bumper cover support portion 86 extends forward in the vehicle longitudinal direction from the anchor portion 72 and toward a front portion 88 of the bumper fascia 34 to an end 90. The bumper cover support portion 86 includes a top portion 92, a bottom portion 94 and a base portion 96 that is integrally formed with the anchor portion 72. In the illustrated example, the top portion 92 and the bottom portion 94 extend outwardly from the base portion 96 and at least one of the top portion 92 and the bottom portion 94 extends toward the other to the end 90, providing a somewhat tapered shape reducing in height from the base portion 96 to the end 90. In FIG. 2, the top portion 92 extends away from the bottom portion 94, but at a slope that is less than that the bottom portion 94 extends toward the top portion 92, providing a somewhat upward slant to the bumper cover support portion 86 as it extends toward the end 90. Such an upward slant arrangement can introduce a longitudinal component to a vertical force F applied to the bumper cover 45, which can be tuned based on the degree of slant, for example, depending on vehicle make, model and design particulars. In some embodiments, the degree of slant may be constant, or change, for example at end portion 100 to be more level to horizontal or to coincide with the contour of the bumper cover 45.

Figure 3:
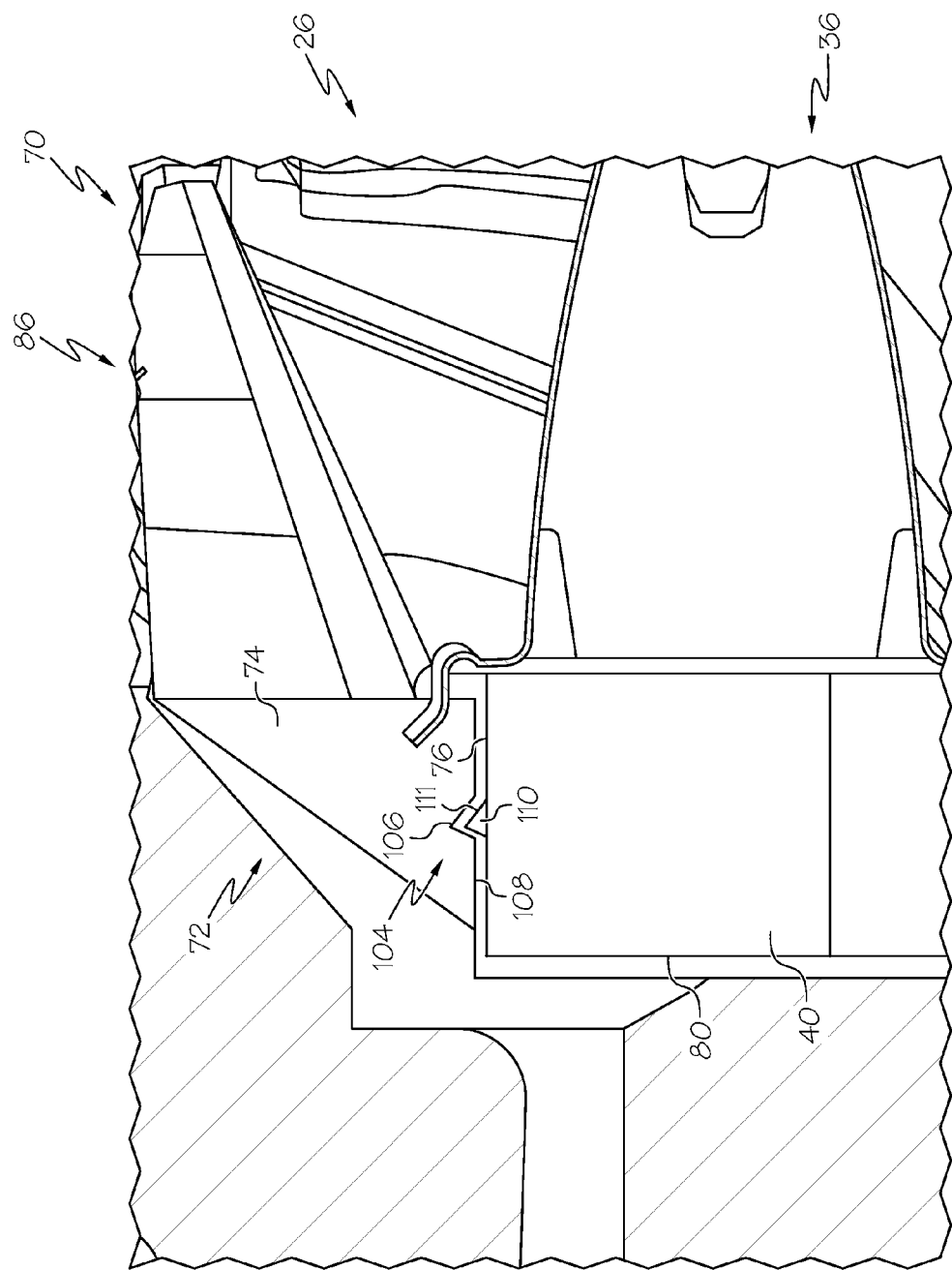
FIG. 3 depicts another side section view of the bumper assembly of FIG. 2 according to one or more embodiments shown or described herein.

Referring now to FIG. 3, the front bumper assembly 26 includes the bumper reinforcement beam 40, the bumper energy absorber member 42 attached thereto and the bumper cover reinforcement 70 that includes the anchor portion 72 engaged with the rear 80 and top 76 of the bumper reinforcement beam 40 and the bumper cover support portion 86 that extends forward in the vehicle longitudinal direction from the anchor portion 72. The upper beam engaging portion 74 and the top 76 of the bumper reinforcement beam 40 include releasable cooperating engagement structures 104. In the illustrated embodiment, the releasable cooperating engagement structures 104 include an engagement groove 106 that is formed in the upper beam engaging portion 74 and that extends along a bottom face 108 of the upper beam engaging portion 74 in the vehicle lateral direction. The releasable cooperating engagement structures 104 further include an engagement projection 110 that extends outwardly from the top 76 of the bumper reinforcement beam 40 an extends along the top 76 in the vehicle lateral direction. The engagement projection 110 is sized and located to be received by the engagement groove 106 along the vehicle lateral direction. The engagement groove 106 and engagement projection 110 may be shaped in cross-section to provide some interference and support for the bumper cover support portion 86 in response to a downward force F (FIG. 2), but also some force off from vertical (e.g., no more than about 45 degrees from vertical). In the illustrated embodiment, the engagement projection 110 is ramp-shaped in cross-section in the form of a triangle; however, other shapes may be used such as rectangular, rounded or irregular shapes. The engagement projection 110 may include a ramp-shaped front surface 111 that extends upwardly from the top 76 of the bumper reinforcement beam 40 at an angle less than perpendicular, such as between about 35 and 80 degrees.

Figure 4:
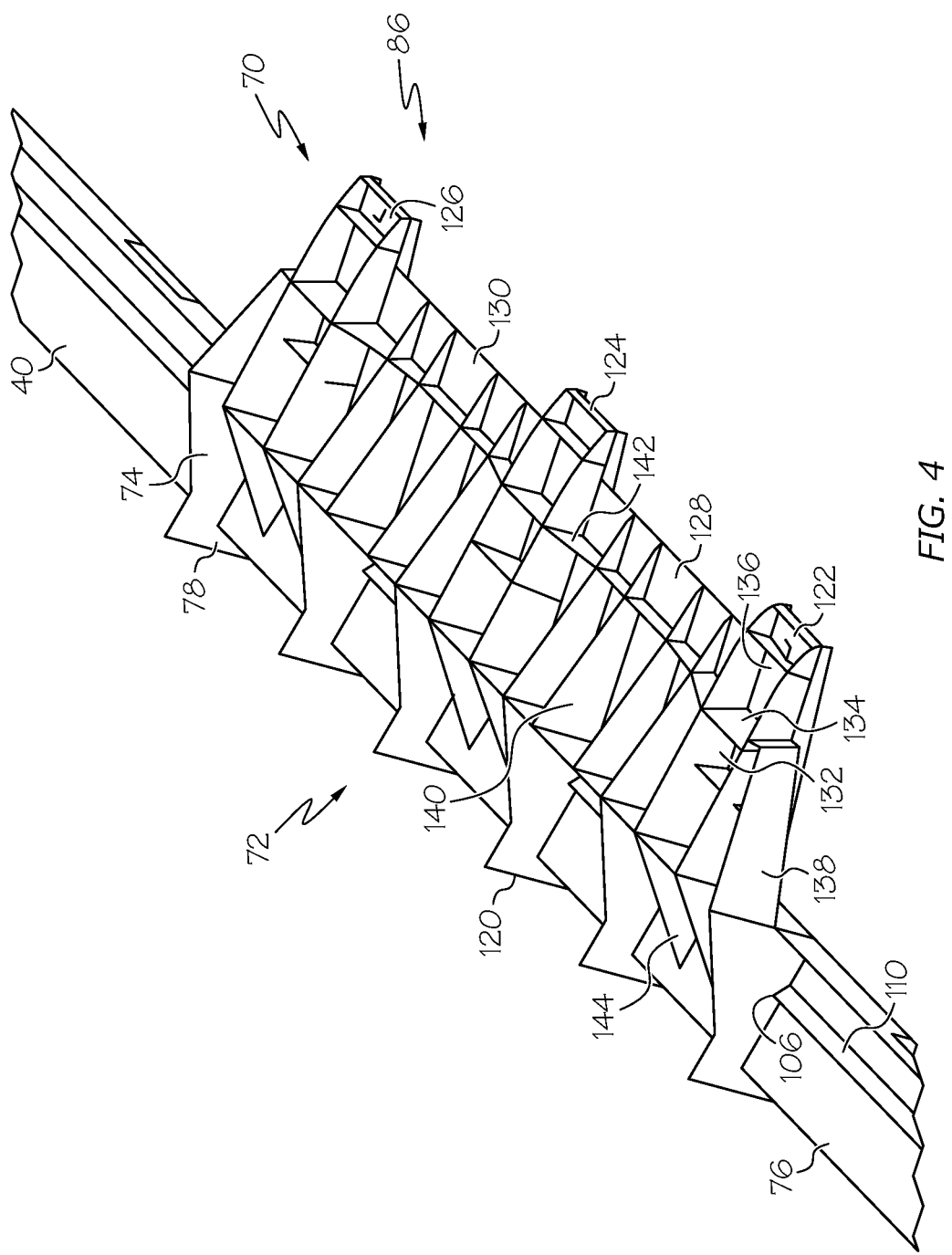
FIG. 4 depicts a bumper cover reinforcement and bumper reinforcement beam of the bumper assembly of FIG. 2 in isolation according to one or more embodiments shown or described herein.

Referring now to FIG. 4, the bumper cover reinforcement 70 and bumper reinforcement beam 40 are illustrated in isolation. The bumper cover reinforcement 70 extends in the vehicle lateral direction across an elongated length of the bumper reinforcement beam 40. The bumper cover reinforcement 70 includes the anchor portion 72 engaged with the bumper reinforcement beam 40 and the bumper cover support portion 86 extending outwardly therefrom. The anchor portion 72 includes multiple, spaced-apart anchor ribs 120 that each form the upper beam engaging portion 74 and the rear beam engaging portion 78. The bumper cover support portion 86 includes multiple major support portions 122, 124 and 126 that are spaced-apart and separated by minor support portions 128 and 130 that span adjacent major support portions 122, 124 and 126, thereby interconnecting the major support portions 122, 124 and 126. By interconnecting the major support portions 122, 124 and 126 in the vehicle lateral direction, increased stability can be achieved in the vertical direction.

Each major support portion 122, 124, 126 includes longitudinal support ribs 132 that extend generally in the vehicle longitudinal direction and lateral support ribs 134 that extend generally in the vehicle lateral direction between the longitudinal support ribs 132 when the bumper cover reinforcement 70 is engaged with the bumper reinforcement beam 40. The support ribs 132 and 134 extend outwardly from and generally perpendicular to a base 136. End diagonal support ribs 138 may be provided to connect the outermost anchor ribs 120a and 120b to the major support portions 122 and 126. The diagonal support ribs 138 may extend in both lateral and longitudinal directions. In some embodiments, each minor support portion 128 and 130 may also include longitudinal support ribs 140 and lateral support ribs 142 extending therebetween.

As can be seen by FIG. 4, the engagement groove 106 is discontinuous and formed through each one of the anchor ribs 120. In some embodiments, additional anchor ribs 144 may be provided between the anchor ribs 120 and also be provided with the engagement groove 106. The anchor ribs 144 may extend in the vehicle longitudinal direction from the major support portions 122, 124 and 126 and terminate on the top 76 of the bumper reinforcement beam 40, providing additional engagement locations with the engagement projection 110. In other embodiments, the anchor ribs 144 may also include rear beam engagement portions. In some embodiments, the engagement projection 110 may extend continuously along the bumper reinforcement beam 40 in the vehicle lateral direction. As examples, the engagement projection 110 may be a separately formed structure (e.g., formed of rubber, plastic, metal, etc.) and connected to the bumper reinforcement beam 40 by any suitable method such as welding, adhesive, fastening, etc. In other embodiments, the engagement projection 110 may be integrally formed with the bumper reinforcement beam 40, such as by forging, extruding, machining, etc. In other embodiments, the engagement projection 110 may be discontinuous and include two or more spaced-apart portions. The number and position of the engagement ribs can be changed to tune the level of engagement with the bumper reinforcement beam 40.

Referring back to FIG. 2, in operation, the bumper cover reinforcement 70 provides additional resistance to a downward force F applied to the bumper cover 45 in the vehicle vertical direction. Such a force F tends to cause a downward deflection of the bumper cover 45, movement of which is resisted by the presence of the bumper cover support portion 86 adjacent the bumper cover 45, which is supported by the anchor portion 72 engaged with the bumper reinforcement beam 40. In embodiments including the releasable cooperating engagement structures 140, the bumper cover reinforcement 70 may also provide an increased resistance of a downward force F' offset from vertical (e.g., between 1 degree and 45 degrees offset from the vehicle vertical direction). Because the bumper cover reinforcement 70 and bumper reinforcement beam 40 are separate components, the bumper cover reinforcement 70 has a reduced influence on the performance of the energy absorber member 42 in response to a longitudinal force $F_2$. In some embodiments, the bumper cover reinforcement 70 can withstand forces in the vehicle vertical direction of at least about 10 kg or more, such as at least about 20 kg or more without disengaging the anchor portion 72 of the bumper cover reinforcement 70 from the bumper reinforcement beam 40. In some embodiments, the anchor portion 72 of the bumper cover reinforcement 70 may disengage the bumper reinforcement beam 40 upon application of a longitudinal force of no more than about 10 kN, such as no more than about 6 kN.

The above-described bumper cover reinforcements can provide a bumper cover that is reinforced in a vehicle vertical direction against a bumper reinforcement beam. The bumper assembly includes a bumper cover reinforcement that extends forward of the bumper reinforcement beam and toward the bumper cover that limits movement of the bumper cover in response to a downward vertical force, which can improve static subjective rigidity of the bumper cover. The bumper cover reinforcement beam can also disengage the bumper reinforcement beam in response to a vehicle longitudinal force, which can maintain pedestrian performance of the bumper assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a bumper assembly comprising:
    a bumper reinforcement beam extending generally in a vehicle lateral direction, the bumper reinforcement beam having a front face, a rear face opposite the front face and a top extending between the front face and the rear face;
    a bumper cover above the bumper reinforcement beam in a vehicle vertical direction; and
    a bumper cover reinforcement comprising an anchor portion supported on the bumper reinforcement beam and a bumper cover support portion extending outwardly from the anchor portion toward the bumper cover, the bumper cover support portion arranged and configured to resist a downward force applied to the bumper cover in the vehicle vertical direction, the bumper cover support portion extending forward in a vehicle longitudinal direction beyond the bumper reinforcement beam to support the bumper cover forward of the bumper reinforcement beam.

2. The vehicle of claim 1, wherein the bumper cover is formed by a bumper fascia covering at least part of the bumper reinforcement beam.

3. The vehicle of claim 1, wherein the anchor portion of the bumper cover reinforcement includes an upper beam engaging portion that engages the top of the bumper reinforcement beam.

4. The vehicle of claim 3, wherein the upper beam engagement portion and the top of the bumper reinforcement beam include releasable cooperating engagement structures that inhibit movement of the bumper cover reinforcement relative to the bumper beam in a vehicle longitudinal direction in response to the downward force applied to the bumper cover support portion in the vehicle vertical direction.

5. The vehicle of claim 4, wherein the releasable cooperating engagement structure of the upper beam engagement portion comprises an engagement groove and the releasable cooperating engagement structure of the top of the bumper reinforcement beam comprises an engagement projection sized and arranged to be received within the engagement groove.

6. The vehicle of claim 5, wherein the engagement projection includes a ramp-shaped front surface that extends upwardly from the top of the bumper reinforcement beam at an angle less than perpendicular.

7. The vehicle of claim 3, wherein the anchor portion includes a rear beam engaging portion extending outwardly from the upper beam engaging portion along the rear face of the bumper reinforcement beam.

8. A bumper cover reinforcement for supporting a bumper cover of a vehicle, the bumper cover reinforcement comprising:
    an anchor portion; and
    a bumper cover support portion extending outwardly from the anchor portion;
    wherein, when installed in a vehicle, the anchor portion is configured to be supported on a bumper reinforcement beam and the bumper cover support portion is configured to extend toward the bumper cover and forward in a vehicle longitudinal direction beyond the bumper reinforcement beam to support the bumper cover forward of the bumper reinforcement beam, the bumper cover support portion configured to resist a downward force applied to the bumper cover in a vehicle vertical direction.

9. The bumper cover reinforcement of claim 8, wherein the anchor portion of the bumper cover reinforcement includes an upper beam engaging portion configured to engage a top of the bumper reinforcement beam.

10. The bumper cover reinforcement of claim 9, wherein the upper beam engagement portion includes a releasable cooperating engagement structure configured to engage a releasable cooperating engagement structure of the top of the bumper reinforcement beam.

11. The bumper cover reinforcement of claim 10, wherein the releasable cooperating engagement structure of the upper beam engagement portion comprises an engagement groove.

12. The bumper cover reinforcement of claim 9, wherein the anchor portion includes a rear beam engaging portion extending outwardly from the upper beam engaging portion configured to extend along the rear face of the bumper reinforcement beam.

13. The bumper cover reinforcement of claim 8, wherein the bumper cover support portion includes multiple major support portions that are spaced-apart and arranged in a side-by-side arrangement to extend along the bumper cover in a vehicle lateral direction.

14. The bumper cover reinforcement of claim 8, wherein the anchor portion comprises multiple anchor ribs that are spaced-apart and arranged in a side-by-side arrangement.

15. A method of providing a bumper cover rigidity, comprising:
    engaging an anchor portion of a bumper cover reinforcement on a bumper reinforcement beam, the bumper cover reinforcement comprising a bumper cover support portion extending outwardly from the anchor portion toward the bumper cover and forward in a vehicle longitudinal direction beyond the bumper reinforcement beam to support the bumper cover forward of the bumper reinforcement beam; and
    the bumper cover support portion resisting a downward force applied to the bumper cover in a vehicle vertical direction.

16. The method of claim 15, wherein the bumper cover is formed by a bumper fascia covering at least part of the bumper reinforcement beam.

17. The method of claim 15 further comprising engaging a top of the bumper reinforcement beam with an upper beam engaging portion of the anchor portion of the bumper cover reinforcement.

18. The method of claim 17 further comprising engaging releasable cooperating engagement structures together carried by the upper beam engagement portion and the top of the bumper reinforcement beam thereby inhibiting movement of the bumper cover reinforcement relative to the bumper beam in a vehicle longitudinal direction in response to the downward force applied to the bumper cover support portion in the vehicle vertical direction.

19. The method of claim 18, wherein the releasable cooperating engagement structure of the upper beam engagement portion comprises an engagement groove and the releasable cooperating engagement structure of the top of the bumper reinforcement beam comprises an engagement projection sized and arranged to be received within the engagement groove.

20. The method of claim 17 further comprising engaging a rear beam engaging portion of the anchor portion with a rear face of the bumper reinforcement beam.

* * * * *